(No Model.)
H. A. WAHLERT.
BOLT.
No. 339,951. Patented Apr. 13, 1886.
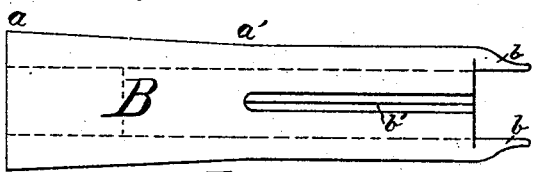
Fig I
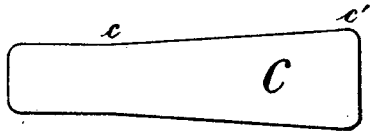
Fig II
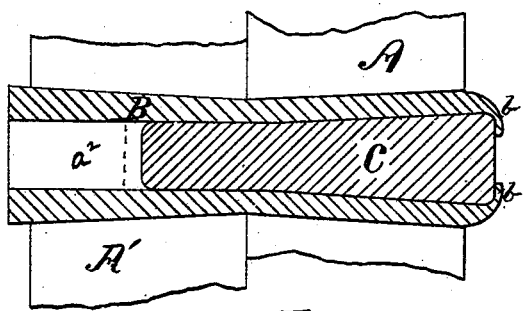
Fig III
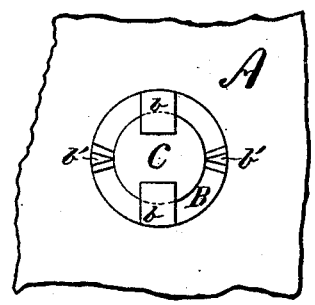
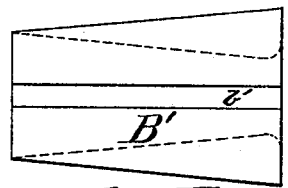
Fig IV    Fig V
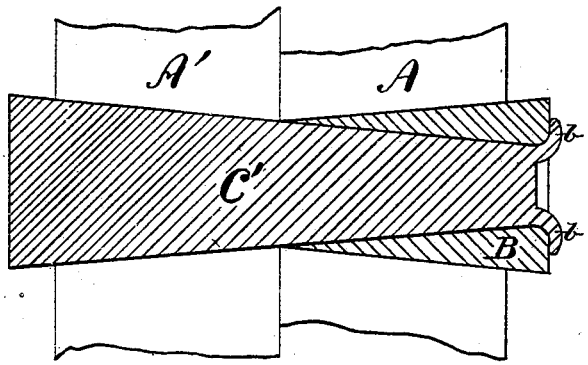
Fig VI
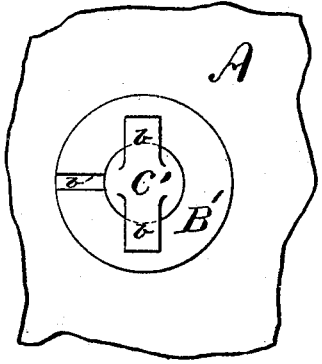
Attest
E. B. Leigh
E. C. Klipstein
Inventor
Henry A. Wahlert

UNITED STATES PATENT OFFICE.

HENRY A. WAHLERT, OF ST. LOUIS, MISSOURI, ASSIGNOR TO THE AMERICAN BRAKE COMPANY, OF SAME PLACE.

BOLT.

SPECIFICATION forming part of Letters Patent No. 339,951, dated April 13, 1886.

Application filed January 20, 1886. Serial No. 189,193. (No model.)

*To all whom it may concern:*

Be it known that I, HENRY A. WAHLERT, a citizen of the United States, residing at St. Louis, in the State of Missouri, have invented certain new and useful Improvements in Bolt-Locks, Rivets, &c., of which the following is a full, clear, and exact description, reference being had to the accompanying drawings illustrating the application of the invention, wherein—

Figure I is a detached view of the bolt; Fig. II, of the center pin or mandrel. Fig. III is a longitudinal central section of the parts united to form a lock or rivet. Figs. IV, V, and VI are similar views of a modification.

Like letters refer to like parts wherever they occur.

My present invention relates to the construction of devices which are applicable as rivets, nut or bolt locks, and in like positions where parts are to be connected securely, disconnected readily, or adjusted to compensate for wear.

The devices are especially valuable in such positions as hot rivets have heretofore been applied, as there is no shrinkage of the bolt, with consequent play of parts, sometimes following the use of hot rivets.

The principle involved, generally stated, is that of the expansion of an annulus by a center plug or mandrel, either of the parts being subsequently upset to lock the parts together.

I will now proceed to describe more specifically the best form known to me of carrying out the invention.

In the drawings, A A' indicate the parts to be united by the devices, and B C the parts embodying the invention.

The part B, which serves as the bolt and extends the length of the fastening, is of tapering form, whereby an independent bolthead may be dispensed with, and whereby also any slack of the parts may be taken up at the will of the user. This taper of the bolt, if the bolt is the annulus, need not extend more than half its length, as from $a$ to $a'$; but if an independent annulus is used, as in the modification, it is preferably extended, say, about ($\frac{2}{3}$) two-thirds the length of the bolt.

The preferred form of bolt B is a hollow cylinder terminating in lugs $b$, or any equivalent thereof which will facilitate the upsetting of the end of the part B, and at intervals the hollow cylindrical bolt is grooved longitudinally, as at $b'$, to facilitate and direct the splitting or expansion of the annulus. The extent or length of these longitudinal grooves $b'$ will depend on the position, object, and function of the devices, character of the parts to be united, &c., all of which will be understood by the skilled mechanic and manufacturer.

C indicates the central plug or mandrel for expanding the annulus. This plug or mandrel, whose smallest diameter is equal to or slightly less than the interior diameter of the hollow cylindrical bolt B, tapers one-half its length, more or less, as from $c$ to $c'$, the whole length of the plug being preferably more than half the length of the part B, so as when in position to extend beyond the grooved or split portion of the annulus B, and beyond the joint so as to make a practically solid bolt.

It will suffice to say in regard to the modification shown in Figs. IV, V, and VI that the bolt may be solid, as shown, and so tapered as to form the mandrel C', while the grooved annulus or cylinder may be reduced one-half the length of the whole fastening, more or less, as shown at B', Figs. V and VI.

The devices being of substantially the character hereinbefore described, the bolt B is passed through the parts which are to be united and the mandrel or plug driven into the annulus, so as to expand and split the same and force it tightly into the bore, at the same time taking up any slack between the parts to be united, the lugs $b$ or the end of the annulus being finally upset to retain the mandrel, or, in case of the modification, the end of the mandrel is upset to bind the parts together.

It is evident that in the preferred form shown in Figs. I, II, and III the bore $a^2$ need not extend entirely through the bolt B, but may terminate at the dotted line, or only be of such length as will accommodate the mandrel; but I prefer the hollow cylindrical form shown in the drawings for two reasons: first, the bolt may be made lighter or with less metal for the required strength, and, secondly, it affords a ready method of breaking the lock by inserting a second mandrel or rod to drive out the short mandrel, which forms part of the devices.

Having thus described the nature, operation, and advantages of my invention, what I claim, and desire to secure by Letters Patent, is—

1. In a bolt-lock or rivet, the combination of a tapering mandrel and an expansible annulus, the parts being united or held together by upsetting the metal, substantially as and for the purposes specified.

2. In a bolt-lock or rivet, the combination of a tapering mandrel and a longitudinally grooved or split annulus, substantially as and for the purposes specified.

3. In a bolt-lock or rivet, the combination, with an annular bolt having longitudinal grooves or splits at one end, of a tapered mandrel, substantially as and for the purposes specified.

4. In a bolt-lock or rivet, the combination, with an annular bolt having longitudinal grooves or splits at one end, and projecting clinch-lugs, of a tapering mandrel adapted to expand the split or grooved end of the bolt, substantially as and for the purposes specified.

5. In a bolt-lock or rivet, the combination of an annular bolt tapered at one end, and having longitudinal grooves or splits at the opposite end, and a tapering mandrel adapted to expand the grooved or split end of the bolt, substantially as and for the purposes specified.

In testimony whereof I affix my signature, in presence of two witnesses, this 2d day of January, 1886.

HENRY A. WAHLERT.

Witnesses:
GEORGE H. POOR,
E. B. LEIGH.